Nov. 9, 1937.  E. J. SABALLUS ET AL  2,098,677

PUMP TESTING APPARATUS

Filed May 23, 1935  2 Sheets-Sheet 1

Inventors:
Erwin J. Saballus &
John H. O. Saballus
By
atty.

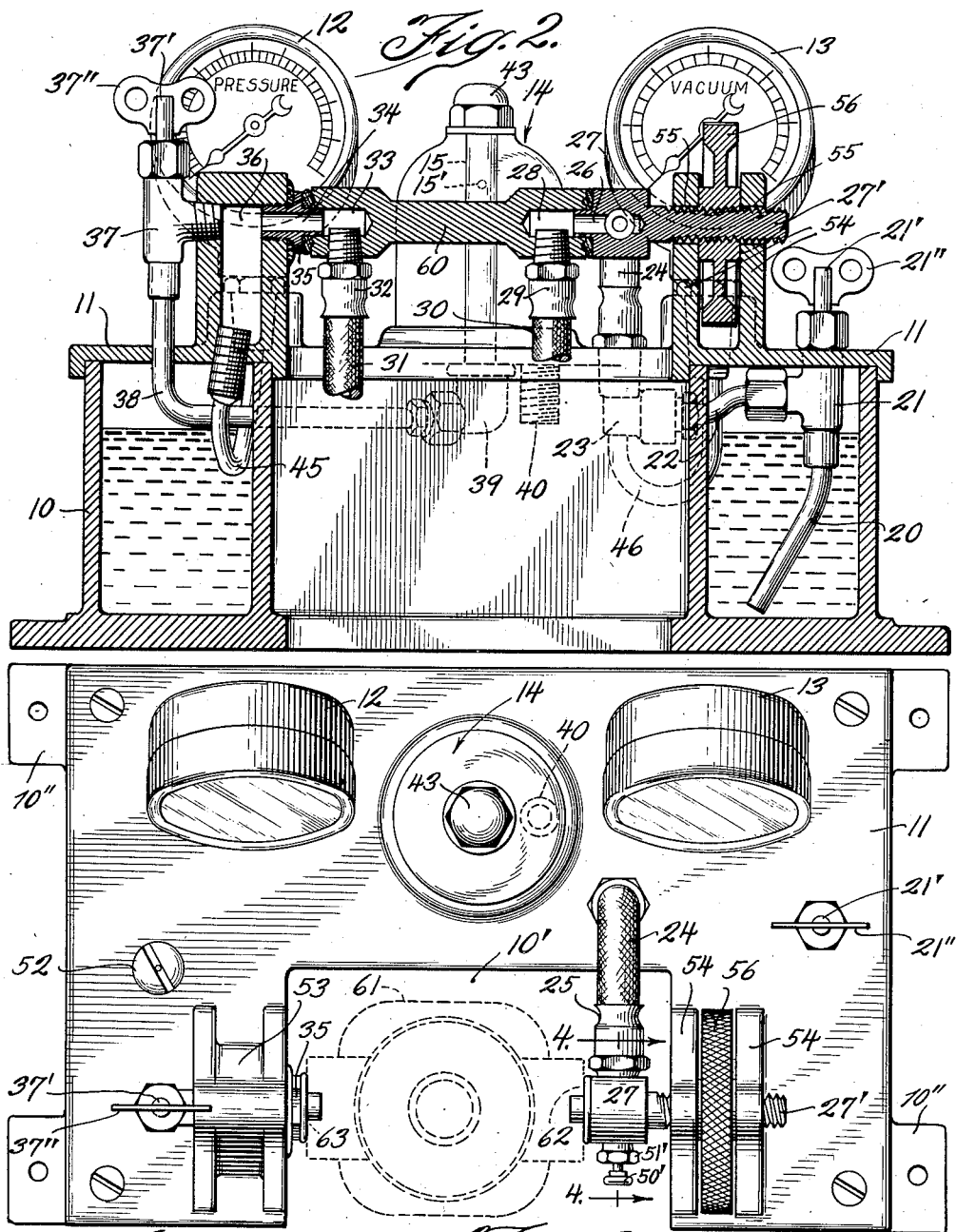

Patented Nov. 9, 1937

2,098,677

UNITED STATES PATENT OFFICE 2,098,677

PUMP TESTING APPARATUS

Erwin J. Saballus and John H. O. Saballus, Chicago, Ill., assignors to Joseph Weidenhoff, Inc., Chicago, Ill., a corporation of Illinois Application May 23, 1935, Serial No. 22,997

12 Claims. (Cl. 73—51)

More particularly the invention relates to an apparatus for testing pumps, it being the general object of the invention to provide a novel and simple apparatus for testing the suction and pressure of pumps.

Another object of the invention is to provide an apparatus for testing pumps which will also indicate whether there are any air leaks to the pump.

A more particular object is to provide a novel device of this character adapted for testing automotive fuel pumps.

A further object is to provide a new and improved apparatus for testing pumps under actual working conditions.

Other objects will become readily apparent from the following detailed description taken in connection with the accompanying drawings, wherein:

Fig. 2 is a vertical section through the apparatus substantially along the line 2—2 of Fig. 1.

Fig. 3 is a plan view with certain detachable parts of the apparatus removed and a different type of pump (shown in outline) in position to be tested.

Fig. 4 is a detailed section along the line 4—4 of Fig. 3.

Figure 1:
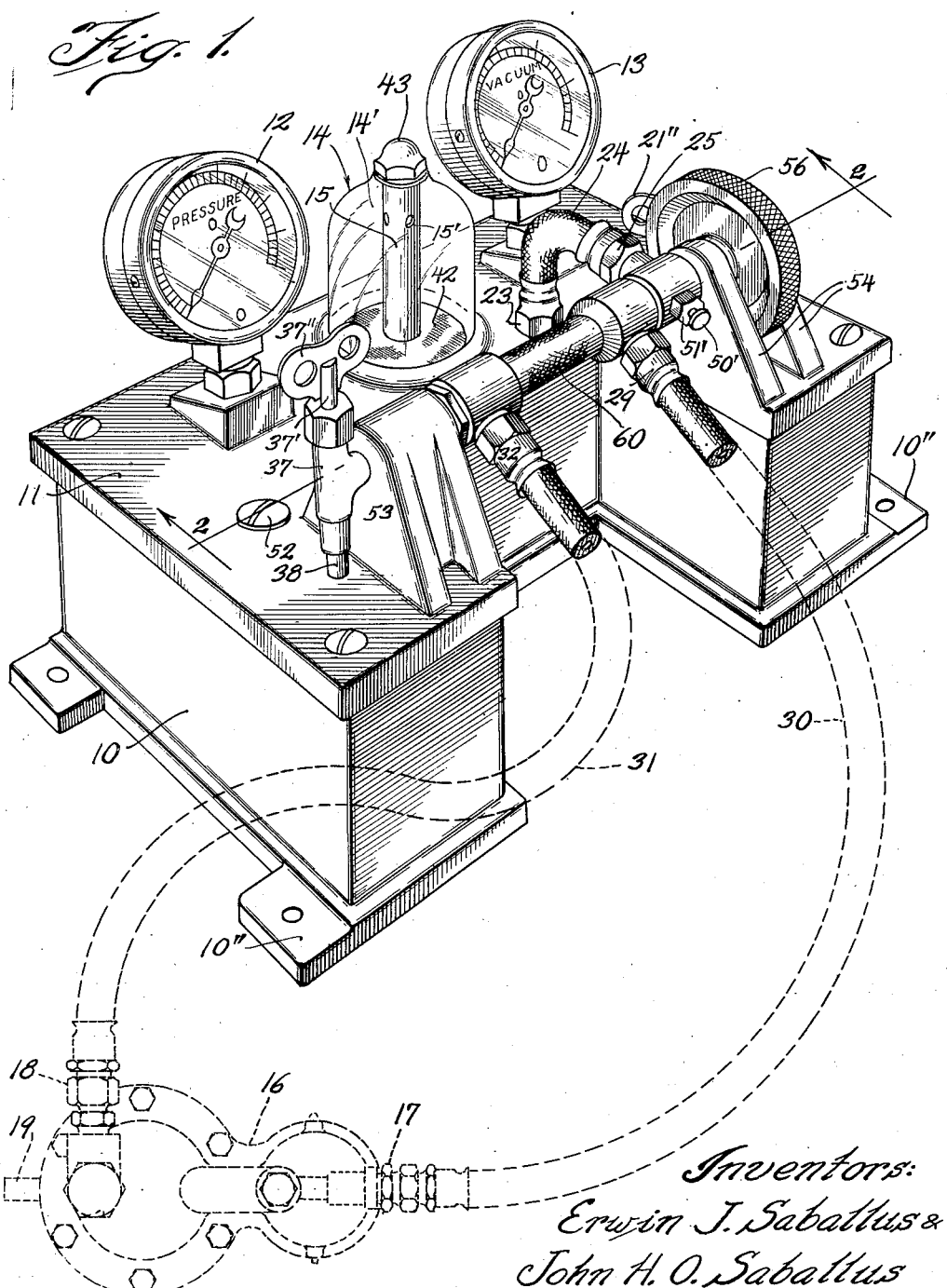
Fig. 1 is a perspective view of a preferred form of the apparatus, shown connected to one type of fuel pump.

Although we have illustrated in the drawings and shall hereinafter describe in detail a preferred embodiment of the invention, it is to be understood that we do not intend to limit the invention to the particular form and arrangement shown. The scope of the invention will be pointed out in the appended claims.

In the form chosen for purposes of disclosure, the invention comprises a tank 10 which also serves as a supporting base, a cover 11 on the tank, pressure and vacuum gages or indicators 12 and 13 mounted on the rear portion of the cover, a flow indicator 14, and means for connecting the indicators selectively with the pump to be tested. Such a pump is indicated in Figs. 1 and 2 at 16, the particular pump illustrated being the diaphragm type having an inlet 17, an outlet 18, and an operating lever 19. The tank 10 is adapted to be partly filled with a liquid such as the fuel normally pumped by the pump being tested, a supply conduit from the tank to the pump comprising, in serial relation, an intake pipe 20 (Fig. 2), a valve casing 21, a pipe 22, an angle fitting 23, a flexible hose 24, a fitting 25, a port 26 formed in an adjustably mounted member 27, a chamber 28 formed in one end of a bar member 60, a fitting 29, and a flexible hose 30. Thus when the pump is operated and a valve 21' in the casing 21 is open, liquid fuel will be drawn from the tank 10 to the pump inlet 17.

Fuel discharged by the pump being tested is preferably returned to the tank 10 so that there is no waste. As illustrated herein (Figs. 1 and 2) the return or pump discharge conduit comprises, in serial relation, a flexible hose 31, a fitting 32, a chamber 33 in the other end of the bar member 60, a port 34 formed in a bushing 35, a chamber 36, a valve casing 37, a pipe 38, an angle fitting 39, a standpipe 15, side wall ports 15' in the standpipe, the flow indicator bowl 14', and a drain 40 to the tank. A valve 37' in the casing 37 is operable to close and open the passage through the valve casing and is provided with a handle 37". The valve 21' in the valve casing 21 is similarly provided with an operating handle 21". Thus when both valves are open fuel will be forced in a closed circuit. From the tank the liquid will pass through the intake conduit to the pump 16 and back through the discharge conduit to the tank. During this passage the liquid is discharged through the ports 15' in the standpipe 15 in streams which project horizontally toward the glass dome or bowl 14, thus making it possible for the operator of the apparatus to observe whether any air is entrained in the fuel. This device thereby serves as a flow indicator and as a means for indicating whether there is an air leak in the pump.

The pressure gage 12 is connected to the discharge conduit by means of a pipe 45 which communicates at one end with the gage and at its other end with the chamber 36. Thus by closing the valve 37' so that the pressure will build up, the discharge pressure of the pump will be indicated on the gage 12.

The vacuum gage 13 is connected to the supply or suction conduit by means of a pipe 46 which communicates at one end with the gage and at its other end with the angle fitting 23. Thus by closing the valve 21' and opening the valve 37' the gage 13 will indicate the vacuum on the suction side of the pump. Preferably a spring-closed air-relief valve 50 is provided in the suction conduit for normally closing a relief port 51 which connects with the port 26 in member 27. Port 51 is formed in a bushing 51' fastened to the member 27. When the tests have been completed, by opening valve 50, by means of a handle

50', and operating the pump, the fuel may be pumped out of the conduits and back into the tank 10.

As illustrated in the drawings, the tank 10 is generally U-shaped when viewed from above (shown most clearly in Figs. 1 and 3), thus providing a recess 10' in the front of the tank to facilitate testing pumps of the type illustrated in outline at 61 in Fig. 3. The tank is provided with anchoring lugs 10'' so that it may be properly mounted, as for example on a bench. The cover 11 is detachably secured to the base portion of the tank by means of suitable screws and is also provided with a removable screw plug 52 to permit of filling the tank. The cover is preferably formed with an upstanding portion 53 at one side of the recess 10' and a pair of upstanding portions 54 on the opposite side of the recess 10'. As will be apparent from Fig. 2, the chamber 36 of the discharge conduit is formed in the cover portion 53 and the bushing 35 and valve casing 37 are mounted on this cover portion. The cover portions 54 serve as a support for the member 27 which has a screw threaded portion 27' of reduced diameter extending through alined openings 55 therein and engaging an adjusting wheel or nut 56 positioned therebetween. The standpipe is herein shown closed at its upper end by means of a cap 43 which also serves to secure the glass dome in fluid tight engagement with the cover 11. A screen 42 is preferably provided in the bottom of the dome to strain the liquid flowing back into the tank through the drain opening 40.

The chambers 28 and 33 are herein illustrated as formed in the bar member 60 which in Figs. 1 and 2 is shown positioned between and supported by the bushing 35 and member 27. It is to this member that the nipples 29 and 32 of the adjacent ends of the flexible hose 30 and 31 are connected. It will be readily apparent that this construction provides for the ready detachment of the member 60 together with the flexible hose merely by turning the nut 56 to withdraw the adjacent end of the member 27 from the bar 60. The bar, together with the conduits 30 and 31, are used in the manner illustrated in Figs. 1 and 2, when pumps of the type shown at 16 are being tested, whereas when the bar and the attached conduits are removed, a pump 61, as illustrated in dotted outline in Fig. 3, may be tested. This latter type of pump is provided with inlet and outlet ports at its opposite ends 62 and 63 respectively, which may be fitted over the adjacent ends of the bushing 35 and member 27. Then by properly turning the nut 56 the pump may be secured in a vertical position within the recess 10'.

The invention as illustrated is readily adapted for testing the pressure produced by the pump, the vacuum produced by the pump and also the flow through the pump, the gages 12 and 13 indicating the pressure and vacuum, respectively, and the flow being indicated by the device 14.

For testing the pressure developed by a pump when operated, the valve 37' is closed and the valve 21' is opened. For testing the flow of the pump, both valves 21' and 37' are opened. For testing the vacuum or suction developed by the pump, the valve 37' is opened and valve 21' is closed.

The apparatus is self-contained so as to eliminate fire hazard and requires but a relatively small amount of liquid fuel. In utilizing the invention, the pumps being tested are tested under actual working conditions, and with the type of fuel ordinarily pumped during their normal service.

With a flow indicator which functions as a leak detector, the apparatus disclosed is especially adapted for testing pumps having no glass bowl through which the fuel is pumped.

We claim as our invention:

1. Apparatus for testing pumps comprising, in combination, a liquid supply tank, means forming a supply conduit for conducting liquid from the tank to the inlet of a pump to be tested, means forming a return conduit for conducting liquid from the outlet of such pump back to the tank, means communicating with said supply conduit for indicating the suction exerted by the pump, means communicating with said return conduit for indicating the pressure exerted by the pump, a shut-off device for each of said conduits, a flow indicating device forming a portion of said return conduit for detecting air leaks, and means for venting the supply conduit to atmosphere while the pump is operated to empty liquid in the conduits and pump back to the tank.

2. An apparatus for testing automobile fuel pumps comprising, in combination, a base forming a fuel supply tank, a cover therefor, laterally spaced upstanding portions on said cover between which a pump may be positioned, a supply conduit having one end extending into the tank, a connecter forming the terminus of the other end of said supply conduit and movably mounted on one of said portions, a return conduit, a connecter forming the terminus of said return conduit and mounted on the other of said portions, indicating means mounted on said cover and associated with said conduits, an adapter for use in testing other types of pumps positionable between said connecters and having independent chambers in the opposite ends thereof which communicate with said connecters, and a pair of flexible hose leading from said chambers.

3. An apparatus for testing automobile fuel pumps comprising, in combination, a base forming a fuel supply tank, a cover therefor, laterally spaced upstanding portions on said cover between which a pump may be positioned, a supply conduit having one end extending into the tank and the other terminating in a connecter movably mounted on one of said portions, a return conduit terminating at one end in a connecter mounted on the other of said portions, means for actuating said movably mounted connecter for the purpose of releasing and engaging said connecter with a pump, and means associated with said conduits for indicating flow and/or pressure characteristics.

4. An apparatus for testing automobile fuel pumps comprising, in combination, a tank for liquid fuel, a pressure gage, a vacuum gage, a first conduit adapted for connection at one end to the outlet of a pump to be tested, means connecting the other end of said conduit to said pressure gage, a second conduit adapted at one end for connection to the inlet of the pump to be tested, means connecting the other end of said second conduit to said vacuum gage, an inlet pipe connected to said second conduit and extending adjacent the bottom of said tank, a valve in said pipe, a transparent glass bowl positioned on the top of the tank, a standpipe extending upwardly into said bowl and having a plurality of side wall ports, means connecting the lower end of said standpipe to said first conduit so that the fuel discharged by the pump passes through said standpipe and out of said ports, a valve for shutting off the flow of fuel to the standpipe, and a drain from said glass bowl to the tank.

5. An apparatus for testing fuel pumps comprising, in combination, a tank for liquid fuel, a pressure gage mounted on said tank, a supply conduit mounted at one end on said tank and having a portion extending adjacent the bottom of the tank and adapted at its other end for connection to the inlet of a pump to be tested, a return conduit mounted at one end on said tank and connected to said pressure gage and adapted for connection at its other end to the outlet of the pump to be tested, and a branch connection from said return conduit for discharging the fuel into the tank including a valve for controlling said branch connection, and a transparent wall surrounding a portion of said branch connection, said connection having a port through which the fuel is discharged in a visible stream within the chamber formed by said transparent wall.

6. An apparatus for testing pumps comprising, in combination, a liquid supply tank, a supply conduit having one end extending into said tank and its other end adapted for connection to the intake of a pump to be tested, a return conduit having one end connected to said tank and its other end adapted for connection to the outlet of the pump to be tested, means mounted on the tank and associated with said supply conduit for indicating the suction in said supply conduit, means mounted on the tank and associated with said discharge conduit for indicating the pressure in said discharge conduit, means mounted on said tank and associated with said supply conduit for relieving the suction in said supply conduit, and means associated with said return conduit and mounted on said tank for indicating entrained air in the liquid discharged by the pump.

7. In apparatus for testing fuel pumps comprising, in combination, a U-shaped tank, a cover for said tank, said cover having a pair of upstanding portions positioned on opposite sides of the recess formed by the arms of the U, a pair of fittings, one mounted in each of said portions, a conduit extending from said tank and terminating in one of said fittings, a second conduit leading from said tank and terminating in the other of said fittings, indicating means mounted on said cover and associated with said conduits, a member insertable between said fittings and having separate chambers in the opposite ends thereof in communication with said fittings when said member is in place, a pair of conduits connected at one end with said chambers and adapted for connection at their other ends with the inlet and outlet of a pump to be tested, and means for withdrawing one of said fittings away from the other to permit removal of said member and the insertion between said fittings of a different type of pump to be tested.

8. Apparatus for testing pumps comprising, in combination, a liquid supply tank, means forming a supply conduit for conducting liquid from the tank to the inlet of a pump to be tested, means forming a return conduit for conducting liquid from the outlet of such pump back to the tank, means mounted on said tank and communicating with said supply conduit for indicating the suction exerted by the pump, means mounted on said tank and communicating with said return conduit for indicating the pressure exerted by the pump, a shut-off device for each of said conduits, and a flow indicating device mounted on said tank and forming a portion of said return conduit for detecting air leaks.

9. An apparatus for testing automobile fuel pumps comprising, in combination, a U-shaped tank having a recess formed by the arms of the U in which a pump may be positioned, a pair of fittings mounted on said tank adjacent said recess for connection to the inlet and outlet of the pump to be tested, a conduit connected at one end to one of said fittings and at the other end to said tank, a second conduit connected at one end to the other of said fittings and at its other end to the lower portion of said tank, and an adapter device for facilitating the testing of pumps which will not fit into said recess comprising a member insertable between said fittings and a pair of conduits carried on said member and communicating with said fittings when said member is inserted between the fittings.

10. A unitary apparatus for testing pumps comprising, in combination, a liquid supply tank for storing liquid to be employed in the testing of the pumps, means forming a supply conduit for conducting liquid from the tank to the inlet of a pump to be tested, means forming a return conduit for conducting liquid from the outlet of such a pump back to the tank, means mounted on said tank and communicating with said supply conduit for indicating the suction created by the pump, means mounted on said tank and communicating with said return conduit for indicating the pressure created by the pump, and a shut-off device for each of said conduits mounted on the tank respectively adjacent the suction and the pressure indicating means and respectively actuated to render the suction or the pressure indicating means operable.

11. An apparatus for testing automobile fuel pumps comprising, in combination, a casing forming a fuel supply tank, laterally spaced means on said casing between which a pump may be positioned, a supply conduit having one end extending into the tank, a connecter forming the terminus of the other end of said supply conduit and movably mounted on one of said means, a return conduit, a connecter forming the terminus of said return conduit and mounted on the other of said means, suction and pressure indicating means mounted on said casing and respectively associated with said supply and return conduits, and an adapter for use in testing pumps not fitting between the connecters positionable between said connecters and having independent chambers in the opposite ends thereof which communicate with said connecters.

12. An apparatus for testing automobile fuel pumps comprising, in combination, a casing forming a fuel supply tank, laterally spaced means on said casing between which a pump may be positioned, a supply conduit having one end extending into the tank, a connecter movably mounted on one of said means and forming the terminus of the other end of said supply conduit, a return conduit terminating at one end in a connecter mounted on the other of said means, means for actuating said movably mounted connecter for the purpose of releasing and engaging said connecter with a pump, and means mounted on said casing and associated with said conduits for indicating pressure characteristics.

ERWIN J. SABALLUS.
JOHN H. O. SABALLUS.